United States Statutory Invention Registration [19]

[11] Reg. Number: H766

Yu

[43] Published: Apr. 3, 1990

[54] POLYARYLATE COMPOSITIONS

[75] Inventor: Thomas C. Yu, Chatham, N.J.

[73] Assignee: Hoechst Celanese Corp., Somerville, N.J.

[21] Appl. No.: 364,078

[22] Filed: May 31, 1989

[51] Int. Cl.[4] ..... C08L 33/08

[52] U.S. Cl. ..... 524/538; 525/425

*Primary Examiner*—John F. Terapane
*Assistant Examiner*—Joseph D. Anthony
*Attorney, Agent, or Firm*—Robert M. Shaw

[57] ABSTRACT

A polymer blend of a polyarylate with a minor amount of a segmented polyesteramide is useful as a molding composition, with improved impact strength and elongation.

20 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYARYLATE COMPOSITIONS

BACKGROUND OF THE INVENTION

This invention is directed to polyarylate molding compositions and molded are made therefrom having improved mechanical properties.

Linear aromatic polyesters prepared from dicarboxylic acids, especially from aromatic dicarboxylic acids and bisphenols are well known for their suitability for molding, extrusion, casting, and film-forming applications. For example, U.S. Pat. No. 3,216,970 to Conix, discloses linear aromatic polyesters prepared from isophthalic acid, terephthalic acid, and a bisphenolic compound. Such high molecular weight compositions are known to be useful in the preparation of various films and fibers. Further, these compositions, when molded into useful articles using conventional techniques, provide properties superior to articles molded from other linear polyester compositions. For instance, aromatic polyesters are known to have a variety of useful properties, such as good tensile, impact, and bending strengths, high thermal deformation and thermal decomposition temperatures, resistance to UV irradiation and good electrical properties.

Present state of the art concerns have been to impart desired physical properties to polyarylate resins by inclusion of additives. For example, the impact properties of polyarylates have been increased by the addition of vinyl impact modifiers. A wide variety of impact modifiers, based on rubbers of polybutadiene, butadiene-styrene copolymers, etc., as well as hydrocarbon based elastomers have been suggested as additives to polyarylates to increase the impact properties of the polymers.

U.S. Pat. No. 3,792,118 discloses a composition comprising 1 to 95% by weight of a styrene resin and about 99 to 5% by weight of a polyarylene ester.

U.S. Pat. No. 4,231,922 is specifically directed to improving the notched izod impact values of polyarylate molding compositions by the addition of a polyalkylene terephthalate and an impact modifier thereto. The impact modifiers comprise SAN copolymers grafted onto an unsaturated elastomeric backbone and have a tensile modulus of less than 100,000 psi.

U.S. Pat. No. 4,281,079 also discloses improving the impact resistance of polyarylene esters by incorporating impact modifiers comprising an elastomeric ethylene 1-alkene copolymer such as ethylene and propylene or 1-butene.

U.S. Pat. No. 4,199,493 discloses improving the processability of reinforced polyarylene esters by intimately blending a polyarylene ester, a reinforcing agent and a vinyl addition polymer.

It is also known that the improvement of an engineering plastic such as polyarylate in terms of moldability by polymer blending tends to involve the thermal stability of the resin. Also, the improvement of chemical resistance tends to lead to a reduction in heat distortion temperature. Therefore, a polyarylate resin composition which retains good thermal stability inherent in the resin and further has good moldability and thermal resistance has long been desired.

U.S. Pat. No. 4,123,420 broadly states that the polyarylate compositions may contain at least one additional polymer such as polyalkylene terephthalates (e.g. polyethylene terephthalate or polybutylene terephthalate), poly(ethylene oxybenzoate), polycarbonates, polyethylene, polypropylene, polyamides, polyurethanes, polystyrene, ABS resins, EVA copolymers, polyacrylates, polytetrafluoroethylene, polymethyl methacrylates, polyphenylene sulfide, and rubbers.

U.S. Pat. No. 4,286,075 discloses a blend of a polyarylate and a thermoplastic polymer including polyalkylene terephthalates, polycarbonates, styrene polymers, alkylacrylate polymers, polyurethane, polyvinylchloride polymers, a polyarylether, a copolyetherester block polymer or a polyhydroxyether.

A blend of polyarylates and polyamides are disclosed in U.S. Pat. Nos. 4,052,481; 4,206,100; 4,254,242 and 4,258,154, all assigned to Unitika Limited, Japan.

Although not directed to polyarylates, U.S. Pat. No. 4,547,547 discloses improving the impact resistance and crystallization velocity of polyalkylene terephthalates by blending the polyester with a minor amount of a segmented polyesteramide. The polyesteramides are those which are described in U.S. Pat. No. 4,129,715 and are those which are used in the present invention which is more fully described below.

U.S. Pat. No. 4,279,801 also discloses a blend of a polyalkylene terephthalate and a thermoplastic poly(ester-urethane) elastomer.

It would be advantageous to impart to polyarylates characteristics not inherent in polyarylate resins or to improve upon particular physical properties without adversely affecting the desirable physical and chemical properties of polyarylates such as the inherent UV stability and high heat distortion temperature.

SUMMARY OF THE INVENTION

The present invention relates to novel polyarylate blends having improved impact resistance and heat stability, said blends comprising:

(a) from 50 to 95 percent by weight of a polyarylate formed by condensing an aromatic dicarboxylic acid or ester thereof with a bisphenol; and as the balance of said blend, (b) a segmented polyesteramide characterized by a recurring unit of the formula

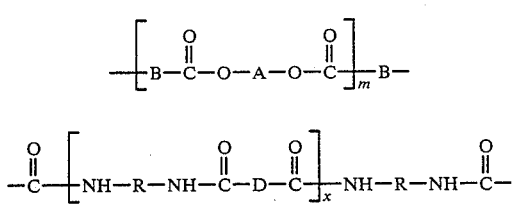

(I)

wherein R is selected from the class consisting of arylenes of the formulae:

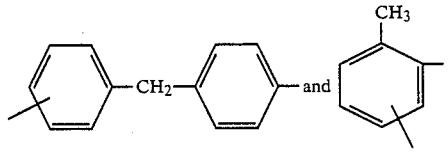

and mixtures thereof, A is the residue of a polymeric diol HO—A—OH having a molecular weight from about 400 to about 4,000, B is the residue of a dicarboxylic acid HOOC-B-COOH selected from the class consisting of aliphatic dicarboxylic acids having from 6 to 14 carbon atoms, inclusive, and isophthalic and terephthalic acids, m has a mean value of not more than 1 but greater than 0, D is the residue of a dicarboxylic acid HOOC-D-COOH such that the melt temperature of the hard segment is not greater than 280° C., and x is a number having an average value from zero to 10.

The term "polymeric diol" which is used herein to characterize residue A in formula (I) above is inclusive of polyether and polyester diols having molecular weights within the stated range. Illustrative of polyether diols are the poly(alkylene ether)diols obtained by polymerizing one or more cyclic ethers such as ethylene oxide, propylene oxide, butylene oxide and tetrahydrofuran. The poly(alkylene ether)diols are inclusive of polyethylene glycol, polypropylene glycol, poly(tetramethylene glycol), polypropylene glycols capped with ethylene oxide, random copolymers of ethylene oxide and propylene oxide, and adducts of ethylene oxide, propylene oxide and like alkylene oxides with homopolymers of conjugated alkadienes such as butadiene, isoprene and the like, and copolymers of said alkadienes with vinyl monomers such as acrylonitrile, methacrylonitrile, styrene, and the like. Preferred polyether diols for use in preparing the polyester amides are poly(tetramethylene glycol) and ethylene oxide-capped polypropylene glycols wherein the ethylene oxide content is within the range of about 5 percent to about 40 percent.

Illustrative of the polyester diols are those obtained by reacting a dicarboxylic acid such as adipic, suberic, azelaic, glutaric acids and the like with an excess, over the stoichiometric amount, of a dihydric alcohol such as ethylene glycol, propylene glycol, 1,4-butanediol, 1,6-hexandiol and the like, including mixtures of two or more such diols.

The term "aliphatic dicarboxylic acids having from 6 to 14 carbon atoms" means the acids represented by the formula HOOC—$C_nH_{2n}$—COOH wherein the total number of carbon atoms, including those in the carboxylic groups, lies within the stated range of $C_nH_{2n}$ represents straight or branched chain alkylene having the appropriate carbon atom content. Illustrative of such acids are adipic, pimelic, suberic azelaic, sebacic, 1,11-undecandioic and 1,12-dodecandioic, brassylic, α-methyladipic, α,α-dimethyladipic, α-ethylpimelic, α-ethylα-methylpimelic, β,β'-diethyl-β,β'-dimethylsuberic, 2,2,4-trimethyladipic, 2,4,4-trimethyladipic, α,α-dimethylazelaic and α,α,α',α'-tetramethylsebacic acids.

The term "dicarboxylic acid HOOC—D—COOH" is inclusive of straight and branched chain aliphatic dicarboxylic acids which do not raise the melt temperature of the hard section of the polymer into which they are introduced above about 280° C. Illustrative of such acids are adipic, azelaic, sebacic, suberic, 1,11-undecandioic, 1,12-dodecandioic, brassylic, and trimethyladipic acids. Particularly preferred are azelaic and adipic as well as a mixture of approximately equimolar amounts of these two acids.

DETAILED DESCRIPTION OF THE INVENTION

The invention is directed broadly to a blend of an aromatic polyester with a minor amount of a segmented polyesteramide. A core-shell impact modifier may also be added to the composition to further enhance performance.

The aromatic polyester used in this invention is obtained from terephthalic acid and/or isophthalic acid and/or functional derivatives thereof and a bisphenol of the following general formula (II)

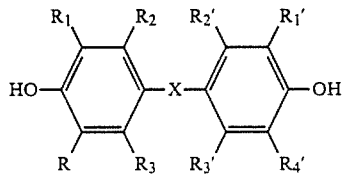

(II)

wherein —X— is selected from the group consisting of —O—, —S—, —$SO_2$—,—SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$, and $R_4'$, which may be the same or different, each is selected from the group consisting of a hydrogen atom, a chlorine atom, a bromine atom and an alkyl group containing 1 to 4 carbon atoms, or functional derivatives thereof.

A mixture of about 90 to about 10 mole % of terephthalic acid and/or a functional derivative thereof and about 10 to about 90 mole % of isophthalic acid and/or a functional derivative thereof is preferred for use as the acid component to be reacted with the bisphenol to prepare the aromatic polyester as referred to in this invention. Preferably, a mixture of 20 to 80 mole % of terephthalic acid and/or a functional derivative thereof and 80 to 20 mole % of isophthalic acid and/or a functional derivative thereof is used. The molar ratio of bisphenol to the sum of the terephthalic acid units and isophthalic acid units is substantially equimolar.

Suitable functional derivatives of terephthalic or isophthalic acid which can be used include acid halides, dialkyl esters and diaryl esters. Preferred examples of acid halides include terephthaloyl dichloride, isophthaloyl dichloride, terephthaloyl dibromide and isophthaloyl dibromide. Preferred examples of dialkyl esters include dialkyl esters of terephthalic and isophthalic acids containing 1 to 6 (especially 1 to 2) carbon atoms in each alkyl moiety thereof. Preferred examples of diaryl esters include diphenyl terephthalate and diphenyl isophthalate.

Examples of suitable bisphenols of the general formula (I) above are 4,4'-dihydroxy-diphenyl ether, bis(4-hydroxy-2-methylphenyl) ether, bis(4-hydroxy-3-chlorophenyl) ether, bis(4-hydroxyphenyl) sulfide, bis(4-hydroxyphenyl) sulfone, bis(4-hydroxyphenyl) ketone, bis(4-hydroxyphenyl)methane, bis(4-hydroxy-3-methylphenyl)methane, bis(4-hydroxy3,5-dichlorophenyl)methane, bis(4-hydroxy-3,5-dibromophenyl)methane, 1,1-bis(4'-hydroxyphenyl)ethane, 2,2-bis(4'-hydroxy-3'methylphenyl)propane, 2,2-bis(4'-hydroxy-3'-chlorophenyl (propane), 2,2-bis(4'-hydroxy-3', 5'-dichlorophenyl)propane, 2,2-bis(4'-hydroxy-3,5'-dibromophenyl)propane, and 1,1-bis(4'-hydroxyphenyl)-n-butane. 2,2-bis(4'-hydroxyphenyl)propane, Bisphenol A, is most typical and is readily available, and, accordingly, is most often used.

Typical examples of functional derivatives of bisphenols which can be used are the metal salts thereof and the diesters thereof with aliphatic monocarboxylic acids containing 1 to 3 carbon atoms. Preferred functional derivatives of the bisphenols are the sodium salts, the potassium salts, and the diacetate esters thereof. The bisphenols may be used either alone or as a mixture of two or more thereof.

A more extensive list of bisphenols and dicarboxylic acid components for producing the polyarylates of this invention are described in U.S. Pat. No. 4,444,960, which patent is herein incorporated by reference.

Any known method can be used to produce these aromatic polyesters. Thus, the interfacial polymerization method which comprises mixing a solution of an aromatic dicarboxylic acid chloride in a water-immiscible organic solvent with an alkaline aqueous solution of bisphenol, the solution polymerization method which comprises heating a bisphenol and an acid chloride in an organic solvent, and the melt polymerization method which comprises heating a phenyl ester of an aromatic dicarboxylic acid and bisphenol, all of which are described in detail in U.S. Pat. Nos. 3,884,990, and 3,946,091, can, for example, be employed.

In order to insure the aromatic polyesters have good physical properties they should have an intrinsic viscosity (IV) of about 0.3 to about 1.0, preferably 0.4 to 0.8, determined in 1,1,2,2-tetrachloroethane at 30° C.

Typically the polymerization process is carried out in the presence of an acidic, neutral or basic catalyst, such classifications being based on the reaction of a conventional acid-base indicator and the catalyst when the latter is dissolved in a polar ionizing solvent such as water. More preferably, a basic catalyst is employed. Prior to its introduction into the reaction mass, the preferred basic catalyst is preferably converted to liquid form, e.g. by melting or by dissolution in a liquid or normally solid, low melting solvent. Suitable basic catalysts include the alkali metals, such as lithium, sodium, potassium, rubidium, cesium and francium and the carbonates, hydroxides, hydrides, borohydrides, phenates, bisphenates, (i.e. salt of a biphenol or bisphenol), carboxylates such as acetate or benzoate, oxides of the foregoing alkali metals. Group II and III elements can also be used in place of the alkali metals of the foregoing classes of compounds such as metals and compounds of calcium, magnesium and aluminum. Other bases include trialkyl or triaryl tin hydroxides, acetates, phenates, and the like. Examples of catalysts are lithium, sodium, potassium, rubidium, cesium and francium metals, potassium or rubidium carbonate, potassium hydroxide, lithium hydride, sodium borohydride, potassium borohydride, calcium acetate, magnesium acetate, aluminum triisopropoxide and triphenyl tin hydroxide.

Phenol is the preferred solvent for the normally solid catalysts. Substituted phenols which can be used include those having the formula O—$R_n$ wherein R is alkyl of 1 to 10 carbon atoms, alkoxy of 1 to 10 carbon atoms, aryl of 6 to 10 carbon atoms, chloro, bromo or mixtures thereof, and wherein n is 1 or 2. Typical solvents include o-benzyl phenol, o-bromo phenol, m-bromo phenol, m-chloro phenol, p-chloro phenol, 2,4 dibromo phenol, 2,6 dichloro phenol, 3,5 dimethoxy phenol, o-ethoxy phenol, m-ethyl phenol, p-ethylphenol, o-isopropyl phenol, m-methyoxy phenol, m-propyl phenol, p-propyl phenol, and the like. Other solvents which are particularly useful are of the ether type, for example, tetrahydrofuran and the various glymes, for examples, ethylene glycol dimethylether and the like.

Especially preferred liquid basic catalysts are charged dissolved in a molten normal solid-low melting organic solvent such as phenol. Especially preferred catalysts providing excellent results are the basic catalysts, rubidium phenoxide, potassium phenoxide, and potassium borophenoxide, each dissolved in molten phenol.

In accordance with conventional reaction practice, a catalytically effective amount of the catalyst is employed, for example, about 0.005 to about 2 mol percent or more, preferably about 0.01 to 1 mole percent of the bisphenol in accordance with known techniques of polyester formation.

While any of the known processes can be employed in synthesizing the polyarylates useful in this invention, conditions which are conventional for melt polymerization are especially preferred. According to the conventional practice, the solid reactants are heated above about 100° C., preferably above about 160° C. to melt the reactants. Onset of reaction in the presence of catalyst is generally at a temperature ranging from above about 100° C. to about 275° C., for example, above about 160° C. for reaction of Bisphenol A, diphenyl terephthalate and diphenyl isophthalate. The reaction temperature employed is generally above about 100° C. to about 400° C. or higher, preferably above about 175° C. to about 350° C., more preferably about 175° C. to about 330° C. with the reaction temperature being raised gradually during the polymerization. In the reaction, the aryl group of the diester is displaced as the corresponding relatively volatile monohydroxy aromatic compound, e.g. phenol, for which provision is made for removal, e.g. by distillation from the reaction mixture during the transesterification. Reaction pressure is generally diminished during the reaction, e.g. of about 0.1 mm. of mercury or lower, to aid in the aforementioned removal of the monohydroxy aromatic compound.

Generally, it is preferable in accordance with the prior art to carry out reaction in two stages. The first or prepolymerization stage is carried out at above about 100° C. to about 350° C. preferably about 160° C. to about 330° C., especially about 180° C. to about 300° C. to prepare a low molecular weight polyester or prepolymer of relatively low intrinsic viscosity, e.g. of less than about 0.1 to about 0.3 dl./g. A subsequent polymerization stage is then carried out in which the prepolymer is heated at a somewhat higher temperature namely, at above about 200° C. to about 400° C. or higher, preferably at about 225° C. to about 350° C., especially at about 275° C. to about 330° C. Conveniently, the polymerization stage is carried out in a different reaction vessel from that employed in the prepolymerization reaction stage with effective agitation of reaction mixture in both stages with generally more extreme agitation being used in the polymerization.

In carrying out the melt polymerization, it is preferred prior to catalyst addition to melt the normally solid reactants to provide molten reactants and then heat the reactants if necessary to a temperature sufficient for onset of polymerization. According to this embodiment, a basic catalyst for the polymerization that is normally solid at 30° C. is then introduced in the liquid form to the polymerization concurrent with the molten reactants.

The segmented polyesteramide component of the blends of the invention can be any of those polyesteramides which are described in U.S. Pat. No. 4,129,715, the disclosure of which is incorporated herein by reference.

The polyesteramides of the invention are prepared by a two step procedure. In the first step of the procedure there is prepared a carboxylic acid-terminated polyester by reacting at least 2 molar proportions of a dicarboxylic acid HOOC—B—COOH, wherein B is as hereinbefore defined, or a mixture of two or more such acids, with 1 molar proportion of a polymeric diol HO—A—OH having a molecular weight within the range stated above.

The preparation of the carboxylic acid-terminated polyester prepolymer is carried out in accordance with procedures well-known in the art for such prepolymers. Illustratively, the free acid and the polymeric diol are heated in the presence of a solvent such as toluene, xylene, and the like, and the water of condensation is removed azeotropically from the reaction mixture. If desired, an esterification catalyst such as antimony trioxide, p-toluene sulfonic acid, calcium acetate, and the like, can be employed but the use of catalysts of this nature is generally unnecessary except in a few instances in which the esterification proceeds slowly. When the amount of water of condensation removed from the reaction mixture corresponds to the theoretically calculated quantity, i.e. two moles for each mole of diol, the carboxylic acid-terminated prepolymer is isolated by removing the solvent by distillation, advantageously under reduced pressure.

The carboxylic acid-terminated prepolymer obtained as described above is then reacted with the appropriate diisocyanate $R(NCO)_2$, wherein R is as hereinbefore defined, to form the polyester-amide characterized by the recurring unit (I) in which the value of x is 0. The prepolymer and the diisocyanate are employed in substantially equimolar quantities. Advantageously, but not necessarily, the reaction is carried out in the presence of an inert organic solvent in which the reactants are soluble. By "inert organic solvent" is meant an organic solvent which does not enter into reaction with any of the reactants or with the product and which does not interfere with the desired course of the reaction in any other way. Illustrative of inert organic solvents are tetramethylenesulfone, dichlorobenzene, monochlorobenzene, α-butyrolactone, N-methylpyrrolidone, N,N-dimethylformamide, N,N-diemthylacetamide, xylene, and the like including mixture of two or more such solvents.

In particular, there is included in the reaction mixture, in addition to the carboxylic acid-terminated prepolymer and diisocyanate, a dicarboxylic acid HOOC—D—COOH or a mixture of two or more such acids.

Detailed procedures for the preparation of the polyesteramides are given in the aforesaid U.S. Pat. No. 4,129,715 and will not be repeated here in the interests of brevity.

A preferred group of polyesteramides for use in preparing the polymer blends of the invention are those having the recurring unit of formula (I) wherein A is the residue of a polyesterdiol HO—A—OH, which polyesterdiol is the hydroxyl-terminated product of reaction of adipic, azelaic or 1,12-dodecanoic acid with an excess of 1,4-butanediol or 1,6-hexandiol, B and D are the residues of adipic or azelaic acids, and R is the residue of 4,4'-methylenebis(isocyanatobenzene).

The proportions in which the aromatic polyester component and the polyesteramide component are employed in the blends are generally within the range of about 95 to about 50 percent by weight of the polyester, the remainder of the blend being the polyesteramide. A preferred range of proportions is from about 90 percent to 65 percent of the polyester, the remainder of the blend being polyesteramide.

Alternatively, 1 to 10 wt.% of the polyesteramide can be replaced with an impact modifier without a reduction in properties.

The preferred impact modifier used in accordance with the invention is a multiphase composite interpolymer comprising 25 to 95 weight percent of a first elastomeric phase and 75 to 5 weight percent of a final rigid thermoplastic phase. One or more intermediate phases are optional, e.g., a middle stage polymerized from 75 to 100 percent by weight of styrene may be incorporated.

The first stage is polymerized utilizing 75 to 99.8 weight percent $C_1$ to $C_6$ alkyl acrylate, generally resulting in an acrylic rubber core having a $T_g$ below 10° C., and cross-linked with 0.1 to 5 weight percent cross-linking monomer and further containing 0.1 to 5 weight percent graftlinking monomer. The preferred alkyl acrylate is butyl acrylate.

The cross-linking monomer is a polyethylenically unsaturated monomer having a plurality of additional polymerizable reactive groups, all of which polymerize at substantially the same rate of reaction. Suitable cross-linking monomers include polyacrylic and methacrylic esters of polyols such as butylene diacrylate and butylene dimethacrylate, trimethylolpropane trimethacrylate and the like; di- and trivinyl benzene, vinyl and the like. The preferred cross-linking monomer is butylene diacrylate.

The graftlinking monomer is a polyethylenically unsaturated monomer having a plurality of additional polymerizable reactive groups, at least one of the reactive groups polymerizing at a substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomeric particles. When the rigid thermoplastic phase is subsequently polymerized at the surface of the elastomer, the residual unsaturated additional polymerizable reactive groups contributed by the graftlinking monomer participate in the subsequent reaction so that at least a portion of the rigid phase is chemically attached to the surface of the elastomer. Among the effective graftlinking monomers are allyl groups containing monomers such as allyl esters of ethylenically unsaturated acids, e.g. allyl acrylate, allyl methacrylate, diallyl maleate, diallyl fumarate, diallyl itaconate, allyl acid maleate, allyl acid fumarate and allyl acid itaconate. Somewhat less preferred are the diallyl esters of polycarboxylic acids which do not contain polymerizable unsaturation. The preferred graftlinking monomers are allyl methacrylate and diallyl maleate.

The final stage can be polymerized from a monomer system comprising $C_1$ to $C_{16}$ alkyl methacrylate, styrene, acrylonitrile, alkyl acrylates, allyl methacrylate, diallyl methacrylate and the like, as long as the overall $T_g$ is at least 20° C. Preferably the final stage monomer system is at least 50 weight percent of a $C_1$ to $C_4$ alkyl acrylate.

A most preferred interpolymer has only two stages. The first stage, about 60 to 95 weight percent of the interpolymer, is polymerized from a monomer system comprising 95 to 99.8 weight percent butyl acrylate, 0.1 to 2.5 weight percent butylene diacrylate as the cross-linking agent and 0.1 to 2.5 weight percent allyl methacrylate or diallyl maleate as the graftlinking monomer.

The final stage of the interpolymer is polymerized from 5 to 40 weight percent methyl methacrylate.

The most preferred multiphase composite interpolymer is commercially available from Rohm and Haas and is designated as Acryloid KM-330 TM. Other types of multiphase composite interpolymer such as methacrylate butadiene-styrene (MBS) impact modifier may also be included in composition.

The compositions of this invention are prepared by any conventional mixing method. For example, a preferred method comprises mixing the polyarylate, polyesteramide and impact modifier in powder or granular form in an extruder and extruding the mixture into strands, chopping the strands into pellets and molding the pellets into the desired article.

It should, of course, be obvious to those skilled in the art that other additives may be included in the present compositions. These additives include elasticizers, pigments, flame retardant additives reinforcing agents, such as glass fibers, thermal stabilizers, processing aids, and the like.

The compositions of this invention have utility in a wide variety of applications. The improved impact compositions can be molded into sheets, film, fibers, etc.

EXAMPLE 1

In this example, various blends of polyarylate and polyesteramide were formulated in order to determine the effect on mechanical properties.

All components were dried in an oven before blending. Blending was conducted on a 28 mm ZSK twin screw extruder at a temperature of 275° C. Molding was done by melting the blend at about 540° F. and molding on a 2 ounce Arburg injection molder with a mold temperature of 175° F. The blends were molded into standard test bars. The formulation and the results of testing the molded pieces for mechanical properties are set forth in Table 1. Percents of the various components are by weight.

TABLE 1

POLYARYLATE/POLYESTERAMIDE BLENDS

| Composition | A | B | C | D | E | F |
|---|---|---|---|---|---|---|
| Polyarylate[1] | 100 | 90 | 80 | 70 | 86 | — |
| Polyesteramid[2] | — | 10 | 20 | 30 | 10 | — |
| Acryloid KM-330 TM | — | — | — | — | 4 | 100 |
| Properties | | | | | | |
| Tensile at Yield, (psi) | 10,300 | 9,950 | 8,800 | 7,600 | 9,370 | 5,100 |
| Tensile at Break, (psi) | 9,300 | 8,540 | 7,400 | 6,640 | 8,120 | 5,150 |
| Tensile Modulus, KKpsi | — | .286 | .251 | .211 | .272 | * |
| Elongation at Break | 15.0 | 7.1 | 22.3 | 53.0 | 15.2 | 366.0 |
| Flex Stress at 5% Strain, Kpsi | 13.7 | 12.5 | 10.8 | 9.3 | 12.1 | .950 |
| Flex Modulus, KKpsi | .336 | .305 | .262 | .223 | .300 | .022 |
| Notched Izod at R.T. | 4.5 | 2.8 | 2.3 | 4.9 | 4.2 | NB |
| Heat Distortion at 264 psi, °C. | 153.0 | 131.0 | 124.0 | 123.0 | 125.0 | 23.0 |

*Too soft to be measured accurately
[1]Durel 400, Hoechst Celanese
[2]Estamid 90A, Dow Chemical Company As can be seen from Table 1, the polyarylate and polyesteramide blends substantially maintained the properties of the polyarylate. Notched Izod strength and elongation of Sample D was improved over the polyarylate alone. Sample E illustrates that the substitution of a small portion of the polyesteramide with a known impact modifier improves the impact strength but does not substantially effect the other mechanical properties.

What is claimed is:

1. A polymer blend comprising:

(a) from 95 to 50% by weight of a polyarylate derived from a dihydric phenol and an aromatic dicarboxylic acid, and as the balance of said blend, (b) a segmented polyesteramide characterized by a recurring unit of the formula

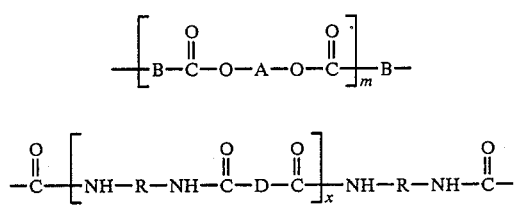

(I)

wherein R is selected from the class consisting of arylenes of the formulae:

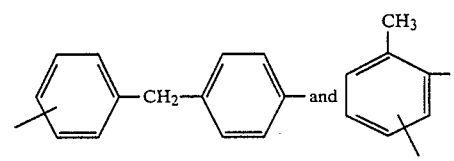

and mixtures thereof, A is the residue of a polymeric diol HO—A—OH having a molecular weight from about 400 to about 4,000, B is the residue of a dicarboxylic acid HOOC—B—COOH selected from the class consisting of aliphatic dicarboxylic acids having from 6 to 14 carbon atoms, inclusive, and isophthalic and terephthalic acids, m has a mean value of not more than 1 but greater than 0, D is the residue of a dicarboxylic acid HOOC—D—COOH such that the melt temperature of the hard segment is not greater than 280° C., and x is a number having an average value from zero to 10.

2. A polymer blend in accordance with claim 1 wherein the residue A in the polyesteramide is that of a polyester glycol.

3. A polymer blend in accordance with claim 2 wherein said polyester glycol is a poly(tetramethylene azelate)glycol.

4. A polymer blend in accordance with claim 1 wherein the residue A in the polyesteramide is that of a polyether glycol.

5. A polymer blend in accordance with claim 4 wherein said polyether glycol is a polytetramethylene glycol.

6. A polymer blend in accordance with claim 1 wherein the residue D in the polyesteramide is that of azelaic acid.

7. A polymer blend in accordance with claim 1 wherein the residue B in the polyesteramide is that of azelaic acid.

8. The polymer blend of claim 1 wherein said dihydric phenol to form the polyarylate has the structural formula:

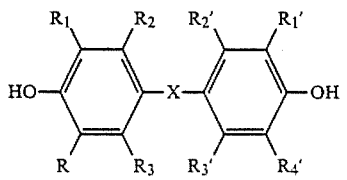

wherein —X— is selected from the group consisting of —O—, —S—, —$SO_2$—,—SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$, and $R_4'$, which may be the same or different, each is selected from the group consisting of a hydrogen atom, a chlorine atom, a bromine atom and an alkyl group containing 1 to 4 carbon atoms, or functional derivatives thereof.

9. The polymer blend of claim 8 wherein the polyarylate is derived from Bisphenol A and an aromatic dicarboxylic acid.

10. The polymer blend of claim 1 wherein said aromatic dicarboxylic acid to form the polyarylate is terephthalic acid or a functional derivative thereof or isophthalic acid or a functional derivative thereof, or mixtures thereof.

11. The polymer blend of claim 1 wherein said polyarylate is present in an amount of from about 65 to 90% by weight and the balance of said blend comprising said polyesteramide.

12. The polymer blend of claim 1 wherein said polyarylate comprises about 70% by weight of said blend and said polyesteramide comprises about 30% by weight of said blend.

13. The polymer blend of claim 1 wherein a portion of the polyesteramide component is substituted with an impact modifier, said impact modifier comprising 1 to 10% by weight of said blend.

14. The polymer blend of claim 1 which also comprises a reinforcing agent.

15. The polymer blend of claim 14 wherein said reinforcing agent is fiberglass.

16. The polymer blend of claim 9 wherein said aromatic dicarboxylic acid to form the polyarylate is terephthalic acid or a functional derivative thereof or isophthalic acid or a functional derivative thereof, or mixtures thereof.

17. The polymer blend of claim 16 wherein said polyarylate is present in an amount of from about 65 to 90% by weight and the balance of said blend comprising said polyesteramide.

18. The polymer blend of claim 16 wherein said polyarylate comprises about 70% by weight of said blend and said polyesteramide comprises about 30% by weight of said blend.

19. A molded article formed by molding the polymer blend of claim 1.

20. A molded article formed by molding the polymer blend of claim 16.

* * * * *